(12) United States Patent
Fuller et al.

(10) Patent No.: US 10,228,672 B2
(45) Date of Patent: *Mar. 12, 2019

(54) REDUCING NUISANCE NOTIFICATIONS FROM A BUILDING AUTOMATION SYSTEM

(71) Applicant: Honeywell International Inc., Morris Plains, NJ (US)

(72) Inventors: Gary Fuller, North Parramatta (AU); Dae-Soon Kwon, North Ryde (AU); Yi-Chang Hsieh, Cammeray (AU); Andie Kurniawan, Mascot (AU); Martin Lee, Lance Cove (AU); Paul Vanderstraeten, North Ryde (AU)

(73) Assignee: Honeywell International Inc., Morris Plains, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/680,756

(22) Filed: Aug. 18, 2017

(65) Prior Publication Data

US 2017/0345287 A1 Nov. 30, 2017

Related U.S. Application Data

(63) Continuation of application No. 15/168,730, filed on May 31, 2016, now Pat. No. 9,754,478.

(51) Int. Cl.
*G08B 29/00* (2006.01)
*G05B 15/02* (2006.01)
*G05B 23/00* (2006.01)
*G08B 21/18* (2006.01)
*G08B 25/00* (2006.01)

(52) U.S. Cl.
CPC ............. *G05B 15/02* (2013.01); *G05B 23/00* (2013.01); *G05B 2219/2642* (2013.01); *G08B 21/187* (2013.01); *G08B 25/001* (2013.01)

(58) Field of Classification Search
CPC .......... G05B 2219/2613; G08B 29/185; G08B 29/16; H04L 12/2827
USPC ........................................ 340/506, 521, 531
See application file for complete search history.

(56) References Cited

U.S. PATENT DOCUMENTS

| 6,064,310 A | 5/2000 | Busak et al. |
| 7,183,899 B2 | 2/2007 | Behnke |
| 7,526,539 B1 | 4/2009 | Hsu |
| 2010/0102948 A1 | 4/2010 | Grohman et al. |

*Primary Examiner* — Toan N Pham
(74) *Attorney, Agent, or Firm* — Honeywell International Inc.

(57) ABSTRACT

Reducing nuisance notifications from building automation systems is described herein. One device includes a memory, and a processor configured to execute executable instructions stored in the memory to receive a notification of an alarm from a building automation system, compare attributes of the alarm to attributes of alarms included in a database of suppressed alarms, refrain from transmitting a notification of the alarm to a mobile device in response to the attributes of the alarm matching attributes of any of the alarms in the database, and transmit a notification of the alarm to a mobile device in response to the attributes of the alarm not matching the attributes of any of the alarms in the database.

20 Claims, 4 Drawing Sheets

216: ALARM 11:32AM
32FC243 PV LOW 19.90 M³/HR
PASS 1 FLOW TO HEATER
JOHN ANDERSON ESCALATED TO
ANTONY TOBIAS 1 HR AGO

218: ALL FOLLOWING UNREAD CLOSED

220: 12:00AM

ALARM 11:01AM
32FC243 PV LOW 19.90 M³/HR
PASS 1 FLOW TO HEATER
JOHN ANDERSON ESCALATED TO
ANTONY TOBIAS 1 HR AGO

SYSTEM ALARM 11:30AM
006 DEA_SERVER COMMS
SERVER LINK TO 006_DEA_SERVER

10:39AM YESTERDAY
003 DEA_SERVER COMMS
SERVER LINK TO 006_DEA_SERVER

UPDATED JUST NOW

REDUCING NUISANCE NOTIFICATIONS FROM A BUILDING AUTOMATION SYSTEM

PRIORITY INFORMATION

This application is a continuation of U.S. application Ser. No. 15/168,730, filed May 31, 2016, now issued as U.S. Pat. No. 9,754,478 on Sep. 5, 2017, the entire specification of which is incorporated herein by reference.

TECHNICAL FIELD

The present disclosure relates to reducing nuisance notifications from a building automation system.

BACKGROUND

Building automation systems can be complex distributed systems. For example, a building automation system can include many different pieces of equipment. As a specific example, a building automation system can include different pieces of heating, ventilation, and air-conditioning (HVAC) equipment as well as other equipment such as sensors, operating panels, controllers, actuators, etc.

The different pieces of equipment included in a building automation system can generate alarms that can notify a user, such as a building manager, of abnormalities in the building automation system. For example, a piece of equipment included in the building automation system, such as a piece of HVAC equipment, may generate an alarm in response to a fault in the HVAC equipment. The alarm may be sent to a mobile device associated with the user by the building automation system.

BRIEF DESCRIPTION OF THE DRAWINGS

FIG. 2 is an illustration of a display on a user interface of a mobile device showing options for suppressing notifications of an alarm, in accordance with one or more embodiments of the present disclosure.

DETAILED DESCRIPTION

Figure 1:
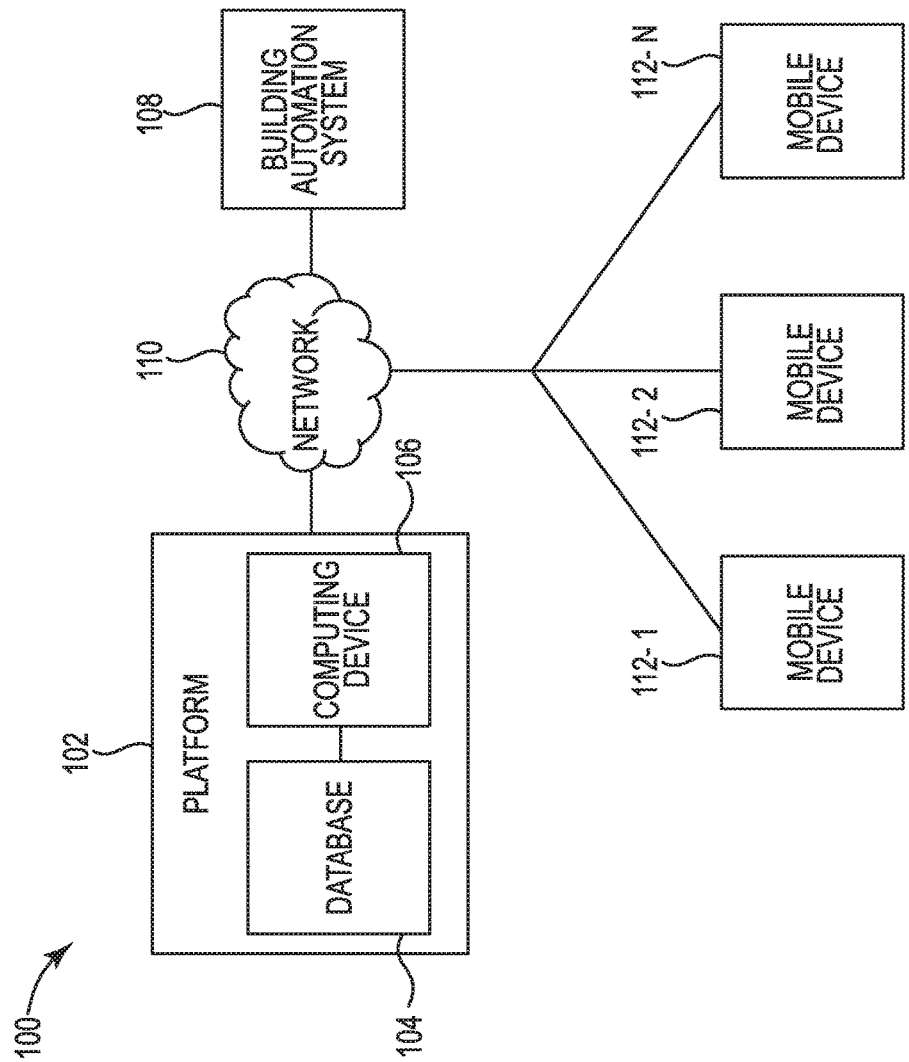
FIG. 1 illustrates an example of a system for reducing nuisance notifications from a building automation system, in accordance with one or more embodiments of the present disclosure.

Reducing nuisance notifications from a building automation system is described herein. For example, one or more embodiments include a memory, and a processor configured to execute executable instructions stored in the memory to receive a notification of an alarm from a building automation system, compare attributes of the alarm to attributes of alarms included in a database of suppressed alarms, refrain from transmitting a notification of the alarm to a mobile device in response to the attributes of the alarm matching attributes of any of the alarms in the database, and transmit a notification of the alarm to a mobile device in response to the attributes of the alarm not matching the attributes of any of the alarms in the database.

Embodiments of the present disclosure can allow for suppression of notifications to reduce nuisance notifications from a building automation system. For example, the user may receive notifications of an alarm generated by the building automation system via a mobile device associated with the user.

In some instances, a user may have diagnosed a fault causing the alarm and put in place plans for remediation of the fault, but the user may not be able to immediately resolve the fault causing the alarm. As an example, a specialist technician may be required to resolve the fault, but may not be able to be scheduled until a few days later. As another example, the user may need to order parts required to resolve the fault that are not immediately available. As a result, the user may continue to receive notifications of the fault, even though plans for remediation of the fault may already be in place.

Reducing nuisance notifications can allow for notifications associated with faults that may have already been diagnosed to be suppressed. Reducing repeated notifications can allow a user to focus on other unrelated alarms that may require the user's attention.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 106 may reference element "06" in FIG. 1, and a similar element may be reference as 406 in FIG. 4. Additionally, the designator "N", as used herein, particularly with respect to reference numerals in the drawings, indicates that a number of the particular feature so designated can be included with a number of embodiments of the present disclosure.

As used herein, "a" or "a number of" something can refer to one or more such things. For example, "a number of mobile devices" can refer to one or more mobile devices.

FIG. 1 illustrates an example system 100 for reducing nuisance notifications from a building automation system, in accordance with one or more embodiments of the present disclosure. As shown in FIG. 1, the system includes a platform 102, a building automation system 108, a network 110, and a number of mobile devices 112-1, 112-2, 112-N. Platform 102 can include a database 104 and computing device 106.

Computing device 106 can receive a notification of an alarm from building automation system 108. For example, computing device 106 can receive an alarm relating to a fault that may be occurring in building automation system 108. For instance, a fault in a piece of HVAC equipment such as a stuck valve may be occurring that causes an alarm to be generated and sent to building automation system 108 by a sensor that sensed the stuck valve. After receiving the alarm from building automation system 108, computing device 106 can transmit a notification of the alarm to the number of mobile devices 112-1, 112-2, and/or 112-N via network 110. As used herein, a mobile device can be a phone (e.g., a smart phone), a tablet, a personal digital assistant (PDA), and/or a wearable device such as a wrist-worn device (e.g., a smart-watch) and/or a head-worn device (e.g., smart-glasses), among other types of devices that may be carried and/or worn by a user.

As used herein, a fault can include an event that occurs to cause a piece of equipment and/or a control strategy of a building to function improperly or to cause abnormal behavior in a building, or a zone of the building, serviced by building automation system 108. In some examples, a fault can include a piece of equipment breaking down. In some examples, a fault can include a component of a piece of equipment ceasing to function correctly. In some examples, a fault can include abnormal behavior of a piece of equipment and/or a zone.

Although a fault is described as including equipment breakdowns and abnormal behavior, embodiments of the present disclosure are not so limited. For example, faults can include any other event that causes equipment or control strategies to function improperly, and/or causes abnormal behavior to occur in a building serviced by building automation system 108.

As used herein, an alarm can include a notification of a fault. For example, a fault may be detected by a physical and/or inferential sensor, where the physical and/or inferential sensor sends (e.g., transmits) a signal to building automation system 108 in response to detection of a fault. Building automation system 108 can generate an alarm to notify a user of building automation system 108, such as a building owner, building manager, engineer, and/or other personnel.

As shown in FIG. 1, computing device 106 can be included in platform 102. Platform 102 can receive notifications of a number of alarms from building automation system 108 via network 110, where platform 102 includes computing device 106 and database 104.

Network 110 can be a wired or wireless network that connects building automation system 108, platform 102, and the number of mobile devices 112-1, 112-2, 112-N. Examples of such a network relationship can include a local area network (LAN), wide area network (WAN), personal area network (PAN), a distributed computing environment (e.g., a cloud computing environment), storage area network (SAN), Metropolitan area network (MAN), a cellular communications network, and/or the Internet, among other types of network relationships.

Computing device 106 can receive, from a mobile device among the number of mobile devices 112-1, 112-2, 112-N, instructions to suppress notifications of an alarm for a predetermined length of time. For example, a user of a mobile device (e.g., mobile device 112-1) may receive, on mobile device 112-1, a notification of an alarm from computing device 106. The user may choose to suppress notifications of the alarm. Once the user chooses to suppress notifications of the alarm, computing device 106 can receive from the mobile device (e.g., mobile device 112-1), instructions from the mobile device 112-1 to suppress notifications of the alarm, as well as any alarms that may be similar to the suppressed alarm, as will be further described herein.

The instructions to suppress notifications of an alarm can be unique to each mobile device of the number of mobile devices 112-1, 112-2, 112-N. For example, a user of mobile device 112-1 may choose to suppress notifications of an alarm for one hour. Only the user of mobile device 112-1 will have notifications of the alarm suppressed for one hour, whereas the remaining users corresponding to mobile devices 112-2, 112-N will receive notifications of the alarm unless the users corresponding to mobile devices 112-2, 112-N also choose to suppress the notification of the alarm. Hence, only those users of mobile devices 112-1, 112-2, 112-N that choose to suppress notifications of an alarm will have the notifications of the alarm suppressed.

Database 104 can include a number of suppressed alarms. For instance, database 104 can include a number of alarms suppressed by each of the users of the number of mobile devices 112-1, 112-2, 112-N, respectively. Each suppressed alarm can include instructions to suppress notifications of the alarm for a predetermined length of time. For example, a user can indicate that notifications of an alarm, or a similar alarm, be suppressed for a predetermined length of time, such as ten minutes, one hour, one day, one week, or any other length of time chosen by the user, as will be further described in connection with FIG. 3.

The alarms included in database 104 can be stored in database 104 for the predetermined length of time. For example, a user may have chosen, via one of the number of mobile devices 112-1, 112-2, 112-N, to suppress notifications of an alarm for one hour. As a result, the suppressed alarm can be stored in database 104 for one hour (e.g., the time corresponding to the predetermined length of time chosen by the user).

Each of the alarms generated by building automation system 108 can includes a number of attributes. As used herein, attributes of an alarm can include characteristics of an alarm. Attributes of an alarm can be assigned to the alarm by the building automation system 108. Attributes of an alarm can be used to determine whether an additional alarm from building automation system 108 is similar to a suppressed alarm and should also be suppressed, as will be further described herein.

Attributes of an alarm can include a condition of the alarm, such as the issue state of the alarm. An issue state of an alarm can include a parameter to describe what the issue state is. For instance, an issue state can include FAULT (e.g., a fault), DISCONNECTED (e.g., equipment is disconnected), POWER OFF (e.g., equipment is powered off), OFFLINE (e.g., equipment is offline), OFF-LIMIT (e.g., equipment parameter/variable off limit), PV-HIGH (e.g., present value of parameter/variable too high), etc. In some examples, a condition of an alarm can include an alarm being a new alarm. For instance, the alarm may be regarding a fault in a piece of equipment included in a building that has not generated an alarm before, or has not generated an alarm for a specified period of time (e.g., has not generated an alarm for one week or longer). In some examples, a condition of an alarm can include the alarm having recently occurred and is therefore being repeated. In some examples, a condition of an alarm can include the alarm expiring.

Attributes of an alarm can include a priority of the alarm. In some examples, a priority of an alarm can include an urgent priority. For instance, the alarm may be regarding a fault in a piece of critical equipment included in a building, such as equipment included in a security system or HVAC system. In some examples, a priority of an alarm can include a high priority. For instance, the alarm may be regarding a fault in a piece of equipment that may be important, but may not need to be addressed in an immediate fashion. In some examples, a priority of an alarm can include a low priority. For instance, the alarm may be regarding a fault in a piece of equipment that may be ignored for a longer period of time than a fault corresponding to a high or urgent priority alarm.

Attributes of an alarm can include a source of the alarm. In some examples, the source of an alarm may include the source of the equipment with a fault. For instance, an alarm may be generated as a result of a fault in a piece of HVAC equipment, and the source of the fault may be a valve of a cooling coil of an air handling unit (AHU) is stuck open, a radiator valve is stuck shut, a hot water pump has stopped working, etc. In some examples, the source of an alarm may include the location of the equipment generating the fault. For instance, an alarm may be generated as a result of a fault in a piece of HVAC equipment, and the source of the fault may be the cooling coil of the AHU located on a third floor equipment room of a building, a radiator valve located in a first floor classroom of a building, or a hot water pump located in an underground boiler room of the building, etc.

Attributes of an alarm can include a category of the alarm. In some examples, the category of an alarm may include the category of the equipment with a fault. For instance, an alarm may be generated as a result of a fault in a piece of HVAC equipment, a fault in a security system, a fault in an electrical system, a fault in a plumbing system, etc. In some examples, the category of an alarm may include a Point Alarm (e.g., an alarm regarding a part of a piece of equipment), System Alarm (e.g., software or core issues such as an expired software license, etc.), and/or other categories of alarms.

Although attributes of the alarms are described as including a condition, priority, source, and category of the alarms, embodiments of the present disclosure are not so limited. For example, attributes of the alarms can include other alarm descriptors/characteristics.

Computing device 106 can compare attributes of an alarm received from building automation system 108 to attributes of alarms included in database 104 of suppressed alarms. For example, computing device 106 can receive an alarm from building automation system 108 and compare the attributes of the alarm from building automation system 108 with attributes of alarms that have been previously suppressed by a user of a mobile device among the number of mobile devices 112-1, 112-2, 112-N to determine whether any or all of the attributes match.

In some examples, the alarm received by computing device 106 from building automation system 108 can be a same alarm (e.g., repeated) as an alarm previously suppressed. For example, a user of a mobile device among the number of mobile devices 112-1, 112-2, 112-N may have previously received a notification of an alarm regarding a fault of a valve included in HVAC equipment. Although the user may have already implemented a strategy to fix the fault of the valve, the valve may not actually be fixed until some future time, and thus the user may keep receiving notifications of the alarm regarding the fault of the valve (e.g., the same alarm).

In some examples, the alarm received by computing device 106 from building automation system 108 can be a different alarm as an alarm previously suppressed. For example, a user of a mobile device among the number of mobile devices 112-1, 112-2, 112-N may have previously received a notification of an alarm regarding a fault of a valve included in HVAC equipment. The user may then receive a notification of an alarm regarding a fault of a hot water pump included in HVAC equipment.

In response to comparing attributes of an alarm received from building automation system 108 to attributes of alarms included in database 104 of suppressed alarms, computing device 106 can refrain from transmitting a notification of the alarm received from building automation system 108 in response to attributes of the alarm received from building automation system 108 matching attributes of the alarms in database 104.

In some examples, a user may have previously suppressed notifications of an alarm regarding a fault of a valve included in HVAC equipment; in response to computing device 106 determining that the attributes of another alarm regarding the fault of the valve received from building automation system 108 match those of the previously suppressed alarm regarding the fault of the valve, computing device 106 can refrain from transmitting a notification of the alarm regarding the fault of the valve to a mobile device among the number of mobile devices 112-1, 112-2, 112-N.

In some examples, a user may have previously suppressed notifications of an alarm regarding a fault of a valve included in HVAC equipment; in response to computing device 106 determining that the attributes of another alarm regarding a fault of a hot water pump of the HVAC system received from building automation system 108 match those of the previously suppressed alarm regarding the fault of the valve, computing device 106 can refrain from transmitting a notification of the alarm regarding the hot water pump to a mobile device among the number of mobile devices 112-1, 112-2, 112-N.

In some examples, computing device 106 may refrain from transmitting a notification of an alarm in response to one of the attributes of the alarm matching at least one of the attributes of a suppressed alarm in database 104. For example, computing device 106 may determine that the source of the alarm received from building automation system 108 matches the source of a suppressed alarm in database 104. Computing device 106 may then refrain from transmitting a notification regarding the alarm received from building automation system 108 to a mobile device among the number of mobile devices 112-1, 112-2, 112-N.

In some examples, computing device 106 may refrain from transmitting a notification of an alarm in response to all of the attributes of the alarm matching all of the attributes of a suppressed alarm in database 104. For example, computing device 106 may determine that all of the attributes of the alarm received from building automation system 108 match all of the attributes of a suppressed alarm in database 104. Computing device 106 may then refrain from transmitting a notification regarding the alarm received from building automation system 108 to a mobile device among the number of mobile devices 112-1, 112-2, 112-N.

Although described as all of the attributes of an alarm received from building automation system 108 matching all of the attributes of a suppressed alarm in database 104 resulting in computing device 106 refraining from transmitting a notification regarding the alarm received from building automation system 108 to a mobile device among the number of mobile devices 112-1, 112-2, 112-N, embodiments of the present disclosure are not so limited. For example, computing device 106 can determine that two or three of the attributes of an alarm received from building automation system 108 match two or three of the attributes of a suppressed alarm in database 104, respectively, that can result in computing device 106 refraining from transmitting a notification regarding the alarm received from building automation system 108 to a mobile device among the number of mobile devices 112-1, 112-2, 112-N.

Computing device 106 may transmit a notification of an alarm received from building automation system 108 in response to the attributes of the alarm not matching the attributes of any of the alarms in database 104. For example, computing device 106 may receive an alarm regarding a valve of a cooling coil in an AHU as being stuck, compare the attributes of the stuck cooling coil valve alarm to attributes of suppressed alarms stored in database 104, and transmit a notification of the stuck cooling coil valve alarm to a mobile device among the number of mobile devices 112-1, 112-2, 112-N in response to none of the attributes of the stuck cooling coil valve alarm matching any of the attributes of the suppressed alarms stored in database 104.

Computing device 106 can receive a further notification of an alarm from building automation system 108 and determine a transmission frequency of notifications of the alarm from building automation system 108. For example, computing device 106 can determine that an alarm regarding a stuck cooling coil valve generates a notification every ten minutes. Computing device 106 can determine the transmission frequency of notifications of the stuck cooling coil valve alarm to be every ten minutes.

Computing device 106 can group notifications of an alarm in response to the transmission frequency of notifications of an alarm being greater than a threshold frequency. For instance, a threshold frequency of an alarm can be five notifications of an alarm per hour. For example, based on a transmission frequency of a notification of an alarm every ten minutes regarding a stuck cooling coil valve that results in six notifications per hour, computing device 106 can group the notifications of the stuck cooling coil valve alarm. Computing device 106 can then transmit the group notification of the alarm to a mobile device among the number of mobile devices 112-1, 112-2, 112-N. Grouping the notifications into a group notification can reduce the frequency of notifications of an alarm sent to a mobile device among the number of mobile devices 112-1, 112-2, 112-N.

As previously described, computing device 106 can receive, from a mobile device among the number of mobile devices 112-1, 112-2, 112-N, instructions to suppress notifications of an alarm for a predetermined length of time. Computing device 106 can remove the suppressed alarm from database 104 after the predetermined length of time has expired. For example, a notification of an alarm suppressed for one hour can be removed from database 104 by computing device 106 after one hour.

Upon expiration of the predetermined length of time, computing device 106 can transmit notifications of the previously suppressed alarms to a mobile device among the number of mobile devices 112-1, 112-2, 112-N. For instance, after a previously selected predetermined length of time of one hour has expired, notifications of a previously suppressed alarm may begin to be transmitted to a mobile device among the number of mobile devices 112-1, 112-2, 112-N. In some examples, if an alarm regarding a radiator valve being stuck shut is received by computing device 106 after expiration of a predetermined length of time of a previously suppressed alarm with attributes matching those of the alarm regarding the radiator valve being stuck shut, computing device 106 can transmit the notification of the alarm regarding the radiator valve being stuck shut to a mobile device among the number of mobile devices 112-1, 112-2, 112-N. The notification may be sent after expiration of the predetermined length of time regardless any of the attributes of the alarm matching any of the attributes of the previously suppressed alarm.

Computing device 106 may transmit a total count of a number of notifications of alarms that were not sent during the predetermined length of time to a mobile device among the number of mobile devices 112-1, 112-2, 112-N after expiration of the predetermined length of time. For example, a user of a mobile device among the number of mobile devices 112-1, 112-2, 112-N may have chosen to suppress notifications for one hour of alarms regarding a radiator valve being stuck. Upon expiration of the one hour, computing device 106 may transmit to the mobile device among the number of mobile devices 112-1, 112-2, 112-N the number of alarms regarding the radiator valve being stuck (e.g., six alarms were generated during the one hour regarding the radiator valve being stuck), as well as any alarms with attributes matching the attributes of the stuck radiator valve alarm (e.g., four alarms were generated that matched attributes of the stuck radiator valve alarm during the one hour), that were received by computing device 106 in that one hour predetermined length of time.

Platform 102 and computing device 106 can receive instructions from a mobile device among the number of mobile devices 112-1, 112-2, 112-N to release notifications of alarms that include attributes matching attributes of an alarm with suppressed notifications prior to the predetermined length of time expiring. For instance, a user can release (e.g., remove suppression) previously suppressed alarms prior to the selected predetermined length of time expiring. For example, a user may have chosen to suppress notifications for one day of alarms regarding a radiator valve being stuck. Prior to the one day expiring, the user may choose to allow notifications of alarms of the stuck radiator valve, as well as any alarms with attributes matching the attributes of the stuck radiator valve alarm, to be transmitted to the user's mobile device 112-1, 112-2, 112-N. Platform 102, and computing device 106, may transmit notifications to mobile device 112-1, 112-2, 112-N in response to receiving the instructions to release the notifications.

Reducing nuisance notifications from a building automation system by allowing users to suppress repeat notifications, as well as other related notifications, can increase the usefulness of mobile application solutions for building automation systems by preventing mobile devices from being occupied by constant receipt of notifications. For example, a user can avoid worrying about notifications of alarms they may already be aware of and have implemented steps to remediate. Reducing this notification noise can allow a user to focus on other alarms that may be new, more urgent, and/or more important.

FIG. 2 is an illustration of a display 214 on a user interface of a mobile device showing options for suppressing notifications of an alarm, in accordance with one or more embodiments of the present disclosure. As shown in FIG. 2, the display 214 can include a notification of an alarm 216, alarm attributes 218, and suppress options 220.

The notification of an alarm 216 can illustrate to a user of the mobile device (e.g., mobile device 112-1, 112-2, 112-N, previously described in connection with FIG. 1) information regarding an alarm generated by a building automation system (e.g., building automation system 108, previously described in connection with FIG. 1). For example, when a notification of an alarm 216 is received by the mobile device, a user of the mobile device can quickly determine information about the alarm using alarm attributes 218.

As shown in FIG. 2, alarm attributes 218 can include conditions, priority, source, and/or category of the alarm. For example, the notification of an alarm 216 can include alarm attributes 218 that specify a condition of the alarm (e.g., 19.90 M3/HR flow rate) and a source of the alarm (e.g., PASS 1 FLOW TO HEATER). This information can allow a user to determine actions to take regarding the alarm and/or how quickly to take those actions.

After a user has received the notification of alarm 216 and has considered actions to take regarding the alarm, the user can suppress further notifications for the alarm and/or notifications of other alarms with similar attributes to the alarm using suppress options 220. For example, a user can utilize suppress options 220 to suppress further notifications for the alarm and/or notifications of other alarms with similar attributes to the alarm for a predetermined length of time, as will be further described in connection with FIG. 3.

Once a user has elected to suppress notifications for the alarm and/or notifications of other alarms with similar attributes to the alarm using suppress options 220, a computing device (e.g., computing device 106, previously described in connection with FIG. 1) can receive the instructions to suppress notifications of the alarm and/or notifications of other alarms with similar attributes to the alarm.

In the event the computing device receives a new alarm from the building automation system, the computing device can compare the attributes of the suppressed alarm with the attributes of the new alarm from the building automation system. If the attributes of the new alarm match the attributes of the suppressed alarm (e.g., as previously described in connection with FIG. 1), the computing device can refrain from transmitting a notification of the new alarm to the mobile device. If the attributes of the new alarm do not match the attributes of the suppressed alarm, the computing device can transmit a notification of the new alarm to the mobile device.

The user of the mobile device can choose to resume receiving notifications for the alarm and/or notifications of other alarms with similar attributes to the alarm prior to the predetermined length of time expiring using suppress options 220. For example, the user can use suppress options 220 to elect to begin receiving notifications for the alarm and/or notifications of other alarms with similar attributes to the alarm by using suppress options 220 to cancel the suppression instructions.

Once a user has elected to cancel suppression of notifications for the alarm and/or notifications of other alarms with similar attributes to the alarm using suppress options 220, a computing device (e.g., computing device 106, previously described in connection with FIG. 1) can receive the instructions to release notifications of the alarm and/or notifications of other alarms with similar attributes to the alarm. Computing device can then transmit notifications of the alarm and/or notifications of other alarms with similar attributes to the mobile device.

Figure 3:
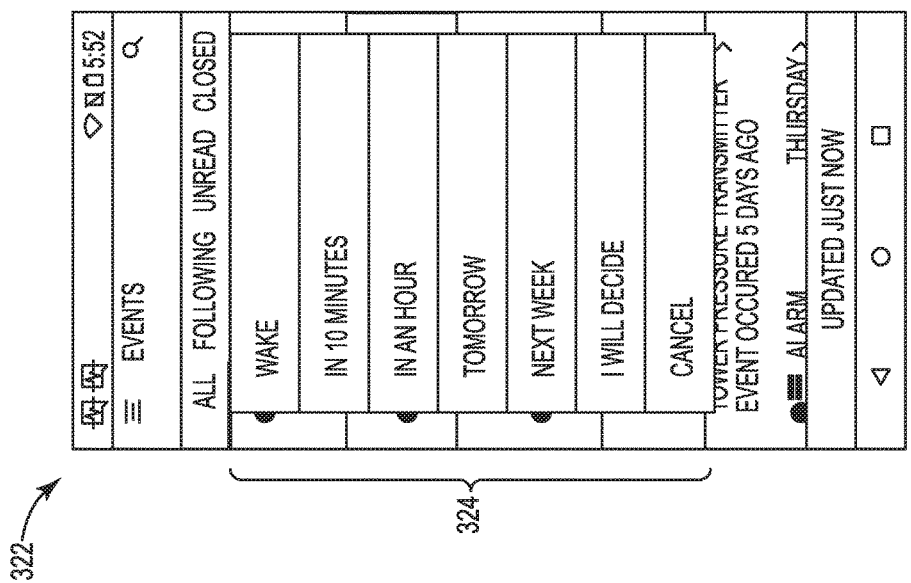
FIG. 3 is an illustration of a display on a user interface of a mobile device showing options for selecting a predetermined length of time for suppressing notifications of an alarm, in accordance with one or more embodiments of the present disclosure.

FIG. 3 is an illustration of a display 322 on a user interface of a mobile device showing options for selecting a predetermined length of time for suppressing notifications of an alarm, in accordance with one or more embodiments of the present disclosure. As shown in FIG. 3, the display 322 can include predetermined length of time options 324.

A user can choose to suppress notifications of an alarm and/or notifications of other alarms with similar attributes for a predetermined length of time using predetermined length of time options 324. In some examples, predetermined length of time options 324 can include various time periods such as ten minutes, one hour, twenty-four hours, or one week. In some examples, the user can choose a different predetermined length of time using predetermined length of time options 324. For instance, the user can select any other length of time to suppress notifications of the alarm and/or notifications of other alarms with similar attributes.

Figure 4:
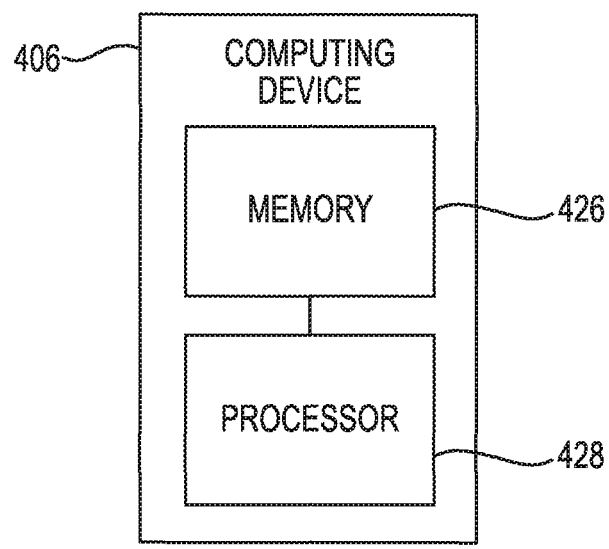
FIG. 4 is a schematic block diagram of a computing device for use with a system for reducing nuisance notifications from a building automation system, in accordance with one or more embodiments of the present disclosure.

FIG. 4 is a schematic block diagram of a computing device for use with a system for reducing nuisance notifications from a building automation system, in accordance with one or more embodiments of the present disclosure. For example, computing device 406 (e.g., computing device 106, previously described in connection with FIG. 1) can include a memory 428 and a processor 426 configured to execute executable instructions stored in memory 428 to receive a notification of an alarm from a building automation system (e.g., building automation system 108, previously described in connection with FIG. 1), compare attributes of the alarm to attributes of alarms included in a database of suppressed alarms, refrain from transmitting a notification of the alarm to a mobile device in response to the attributes of the alarm matching attributes of any of the alarms in the database, and transmit a notification of the alarm to a mobile device in response to the attributes of the alarm not matching the attributes of any of the alarms in the database.

The memory 428 can be any type of storage medium that can be accessed by the processor 426 to perform various examples of the present disclosure. For example, the memory 428 can be a non-transitory computer readable medium having computer readable instructions (e.g., computer program instructions) stored thereon that are executable by the processor 426 to receive a notification of an alarm from a building automation system, compare attributes of the alarm to attributes of alarms included in a database of suppressed alarms, refrain from transmitting a notification of the alarm to a mobile device in response to the attributes of the alarm matching attributes of any of the alarms in the database, and transmit a notification of the alarm to a mobile device in response to the attributes of the alarm not matching the attributes of any of the alarms in the database.

The memory 428 can be volatile or nonvolatile memory. The memory 428 can also be removable (e.g., portable) memory, or non-removable (e.g., internal) memory. For example, the memory 428 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 428 is illustrated as being located within computing device 406, embodiments of the present disclosure are not so limited. For example, memory 428 can also be located internal to another computing resource (e.g., enabling computer readable instructions to be downloaded over the Internet or another wired or wireless connection).

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor. It is presumed that logic similarly executes instructions for purposes of the embodiments of the present disclosure.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computing device for reducing nuisance notifications from a building automation system, comprising:
    a memory; and
    a processor configured to execute executable instructions stored in the memory to:
        receive instructions to suppress a notification of an alarm, wherein the alarm includes attributes;
        compare the attributes of the alarm, received from a building automation system, to attributes of alarms included in a database of suppressed alarms; and
        determine whether to transmit a notification of the alarm to a mobile device based on whether the attributes of the alarm match attributes of any of the alarms in the database.

2. The computing device of claim 1, wherein the processor is configured to execute the instructions to determine to transmit the notification of the alarm to the mobile device in response to the attributes of the alarm not matching the attributes of any of the alarms in the database.

3. The computing device of claim 1, wherein the processor is configured to execute the instructions to determine to not transmit the notification of the alarm to the mobile device in response to the attributes of the alarm matching attributes of any of the alarms in the database.

4. The computing device of claim 1, wherein the processor is configured to execute the instructions to receive a notification of the alarm from a building automation system.

5. The computing device of claim 1, wherein the processor is configured to execute the instructions to:
    group a further notification of the alarm with the notification in response to receiving the further notification, wherein the further notification is of the same alarm as the notification; and
    transmit a group notification of the alarm to the mobile device including the notification and the further notification.

6. The computing device of claim 1, wherein the processor is configured to execute the instructions to not transmit the notification of the alarm in response to receiving instructions to suppress notifications of the alarm for a predetermined length of time from the mobile device.

7. The computing device of claim 1, wherein the attributes of the alarms include at least one of sources of the alarms and priorities of the alarms.

8. A computer implemented method for reducing nuisance notifications from a building automation system, comprising:
    receiving, from a mobile device, instructions to suppress a notification of a first alarm, wherein the first alarm includes a first number of attributes;
    comparing a second number of attributes of a second alarm received from a building automation system to the first number of attributes in response to the instructions to suppress the notification of the first alarm; and
    determining whether to transmit a notification of the second alarm to the mobile device based on whether the second number of attributes match the first number of attributes.

9. The method of claim 8, wherein the method includes transmitting a notification of the second alarm to the mobile device in response to the second number of attributes not matching the first number of attributes.

10. The method of claim 8, wherein the method includes not transmitting the notification of the second alarm to the mobile device in response to the second number of attributes matching the first number of attributes.

11. The method of claim 8, wherein the method includes receiving the instructions to suppress the notification of the first alarm from the mobile device among a number of mobile devices.

12. The method of claim 11, wherein the method includes transmitting the notification of the first alarm and the second alarm to a different mobile device of the number of mobile devices in response to not receiving instructions to suppress the notification of the first alarm from the different mobile device.

13. The method of claim 11, wherein the method includes:
    receiving instructions to suppress the notification of the first alarm from a different mobile device of the number of mobile devices; and
    determining whether to transmit the notification of the second alarm to the different mobile device based on whether the second number of attributes match the first number of attributes.

14. The method of claim 8, wherein the method includes transmitting, to the mobile device, the notification of the first alarm after a predetermined length of time.

15. The method of claim 8, wherein the method includes transmitting, to the mobile device, the notification of the first alarm in response to receiving instructions from the mobile device to release the notification of the first alarm.

16. A system for reducing nuisance notifications from a building automation system, including:
    a platform configured to receive notifications of a number of alarms from a building automation system, wherein the platform includes a database of suppressed alarms and a computing device;
    wherein the computing device is configured to:
        receive, from a mobile device among a number of mobile devices, instructions to suppress notifications of an alarm for a predetermined length of time, wherein the alarm includes a number of attributes;

compare the number of attributes of the alarm to a number of attributes of the number of alarms in response to the instructions to suppress the notifications of the first alarm; and determining to not transmit a notification of the alarm to the mobile device for the predetermined length of time in response to at least one of the number of attributes of the alarm matching at least one of the number of attributes of the number of alarms from the building automation system.

17. The system of claim 16, wherein the computing device is configured to release the alarm from the database after a different predetermined length of time.

18. The system of claim 16, wherein the computing device is configured to transmit a notification of the alarm to the mobile device in response to the alarm being released from the database.

19. The system of claim 16, wherein the computing device is configured to count a number of notifications of alarms that were not sent during the predetermined length of time.

20. The system of claim 19, wherein the computing device is configured to transmit, to the mobile device after expiration of the predetermined length of time, the total count of the number of notifications of alarms that were not sent during the predetermined length of time.

* * * * *